United States Patent [19]

Kühlmann

[11] 4,235,199
[45] Nov. 25, 1980

[54] BATTERY ARRANGEMENT FOR LAYING HENS

[76] Inventor: Josef H. Kühlmann, Konigstrabe 51, D-4401 Laer, Fed. Rep. of Germany

[21] Appl. No.: 56,047

[22] Filed: Jul. 9, 1979

[30] Foreign Application Priority Data

Apr. 4, 1979 [DE] Fed. Rep. of Germany ... 7911073[U]

[51] Int. Cl.³ .............................................. A01K 31/16
[52] U.S. Cl. ..................................................... 119/48
[58] Field of Search .................... 119/48; 222/307, 296

[56] References Cited

U.S. PATENT DOCUMENTS

| | | | |
|---|---|---|---|
| 3,002,494 | 10/1961 | Murray | 119/48 |
| 3,145,793 | 8/1964 | Ray | 119/48 X |
| 3,306,259 | 2/1967 | Willauer, Jr. | 119/48 |
| 3,692,169 | 9/1972 | Kuhlmann | 198/43 |

*Primary Examiner*—Hugh R. Chamblee
*Attorney, Agent, or Firm*—Merchant, Gould, Smith, Edell, Welter & Schmidt

[57] ABSTRACT

An improved automatic battery for laying hens is disclosed. The battery consists of cages (2) having sloping floor in order to cause the eggs to roll toward a conveyor belt (8). To prevent egg breakage caused by eggs rolling to fast, a cable (10) restraint is provided. This cable stops the eggs just prior to entering the conveyor. The cable is attached with movable arms (12) which hold it in place along the entire length of the battery. When desired, the cable is tensioned and the cable rises up along the length of the battery allowing the eggs to gently roll on to the adjacent conveyor. Further clip arms (11) prevent the force of the eggs alone from lifting the cable. The tension is then relieved and the cable returns to is original position.

13 Claims, 5 Drawing Figures

BATTERY ARRANGEMENT FOR LAYING HENS

TECHNICAL FIELD

The present invention relates to improvements in automatic hen batteries designed to automatically collect eggs and droppings of laying hens.

BACKGROUND OF THE PRIOR ART

Basic hen battery arrangements are described in U.S. Pat. No. 3,002,494. In the more modern devices, eggs are carried from the cages arranged in a horizontal row by a separate conveying means associated with the said row and not, as in the case of U.S. Pat. No. 3,002,449, by a conveying means which is used simultaneously to carry away the droppings.

German Utility Model, published on Nov. 4, 1976, describes an arrangement of this kind having separate conveying means, eggs running down the sloping floor are prevented from colliding by means of an elastic band arranged in the free passage between the floor and the front wall of the cage, means beings provided for raising the said band. The purpose of this band is to halt the eggs laid by the hens, for a certain length of time, before they reach the conveyor belt. From time to time the band is raised, allowing the eggs to roll slowly, from their position at the front of the cage, onto the conveyor belt.

BRIEF SUMMARY OF THE INVENTION

The present invention is an improved hen battery having a forwardly and downwardly sloping floor and a cable for stopping eggs from rolling down the sloping floor too fast to the egg collecting conveyor and breaking. The cable restrains the eggs and is coated with a cushing material to soften the impact of eggs striking the cable. The cable is carried on vertical arms spaced apart along the length of the battery and adapted to pivot about a horizontal axis. A tensioning device tightens the cable causing it to rise vertically and thereby let the eggs previously restrained by the cable to pass on to the egg carrying conveyor.

Where a large number of cages are arranged horizontally side by side, considerable force is required to raise this cable, since the eggs resting against it apply a certain amount of pressure and must be moved back when the cable is raised.

It is the purpose of the invention to effectively slow the speed of the rolling eggs and to develop an egg restraining cable which can be easily raised with a minimum of force.

In contrast to the prior art, in the present invention, force is not applied vertically to the cable, i.e. the cable is not lifted; instead, the force is applied in the direction of the longitudinal axis of the cable, i.e. the cable is merely tensioned horizontally. The necessary lifting of the cable, to allow the eggs to pass to the conveyor, is achieved by means of the arms. One end of each arm being secured to the cable, while the other end is mounted upon the cage to pivot about a horizontal axis. When tension is applied to the cable, the arms describe an arc and raise the cable upwardly, thus providing room for the passage of the eggs. By using a cable of sufficient tensile strength it is possible to tension the cable at one end of a long row of cages with only one tensioning device, thus eliminating the need for individual mechanisms at each cage for allowing the eggs to pass to the conveyor.

The invention further includes cable clips which are arranged on the front of the cage. Each clip has a front web of which is slightly off the vertical. The web is preferably held at about 93° to ensure that the weight of the eggs cannot force the cable upwards and thus inadvertently release the eggs, allowing them to roll onto the conveyor. This 93° angle makes the front web slope slightly towards the cable thereby creating frictional resistance which tends to prevent the cable from sliding upward and releasing the eggs.

The cable clips are preferably of a closed design, to ensure that the cable is guided correctly. The cable clips are carried by plates equipped at their backs with retaining grooves. This makes it a simple matter to attach these plates to existing hen battery units.

The cable is preferably made of wire encased in a synthetic material. The wire provides the necessary tensile strength, and the plastic acts as a resilient buffer between the cable and the egg, thus preventing the eggs from being broken.

BRIEF DESCRIPTION OF THE DRAWINGS

An example of embodiment of the invention is explained hereinafter in conjunction with the drawing attached hereto, wherein.

DETAILED DESCRIPTION OF THE INVENTION

Figure 1:
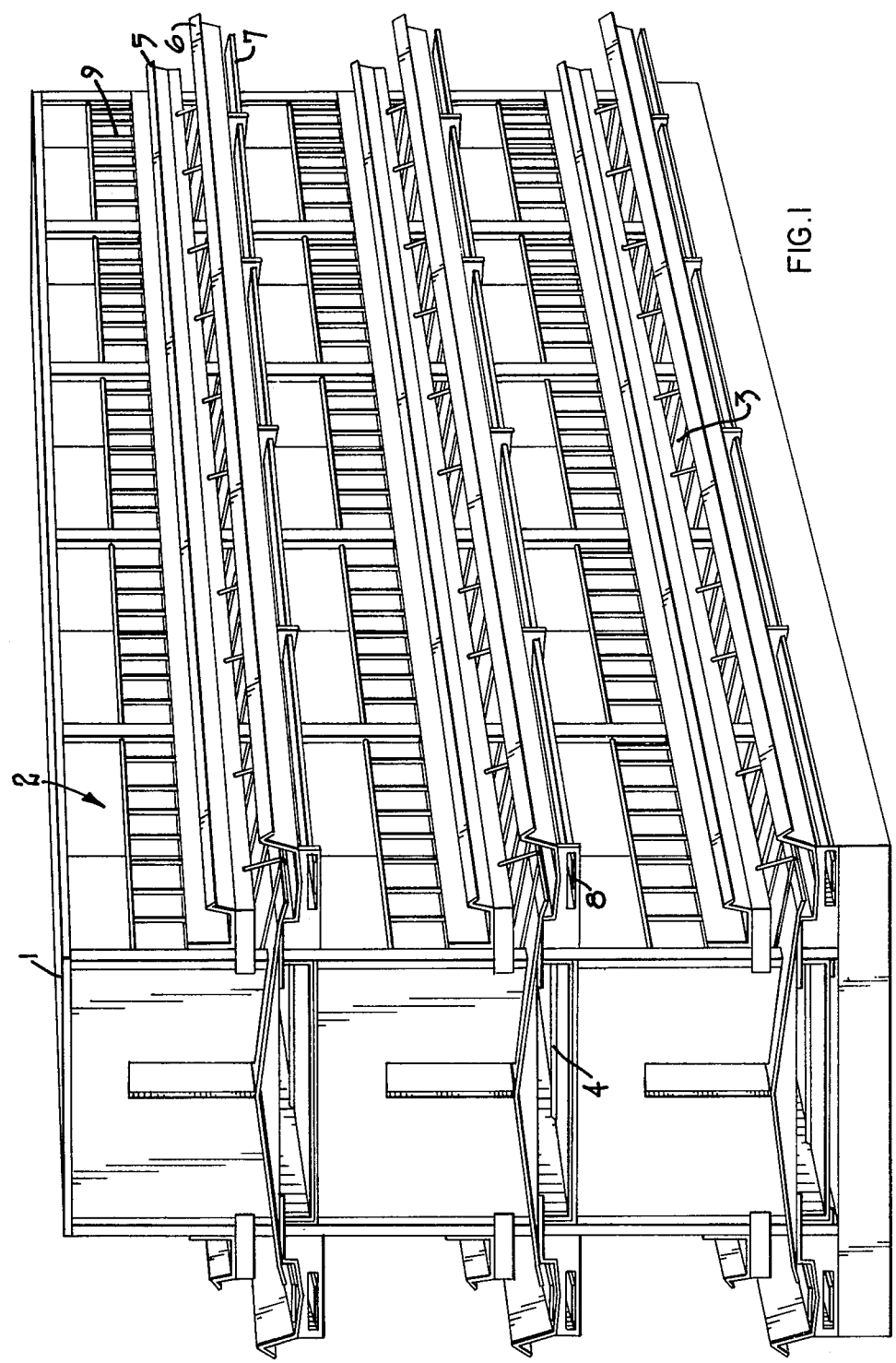
FIG. 1 is a diagrammatic illustration of a part of a battery cage.

Referring to the drawings in detail, FIG. 1 illustrates a hen battery in which several cages are arranged one above the other and side by side in a housing 1. The sides and tops of the cages are defined by closed walls, whereas the bottom of each cage is in the form of a grating 3 upon which the animals stand, the mesh size being such as to allow the droppings to fall through but not the eggs. It can be seen from the drawing that grating 3 has a slope which causes the eggs to roll towards the front of the battery. The droppings pass through the grating onto a conveyor 4 which carries them away. Arranged along the front of the cages is a feed-trough 5 comprising a feed-transporting chain and an egg-transporting device 6 in the form of a conveyor belt having lower run 7 and upper run 8 of which are visible in the drawing, the front sides of the cages having gratings 9 through which the animals may reach their feed.

The preferred embodiment includes a cable 10 which is guided by clips 11 and is carried by substantially vertical holders 12 which are hinged at 14 to the front of the cages. Holders 12 enclose the cable and are fixedly secured thereto at 15, to prevent movement in the horizontal direction. The cable consists of stranded wire 16 enclosed in a synthetic casing 17.

Figure 2:
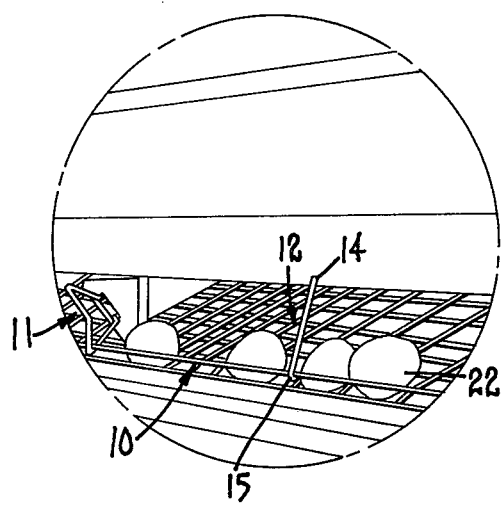
FIG. 2 illustrates an enlargement of the cable, the arms and the cable slips.
Figure 3:
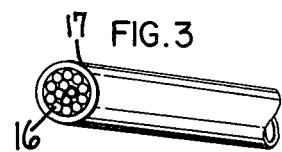
FIG. 3 illustrates a further enlarged view of the cable.
Figure 4:
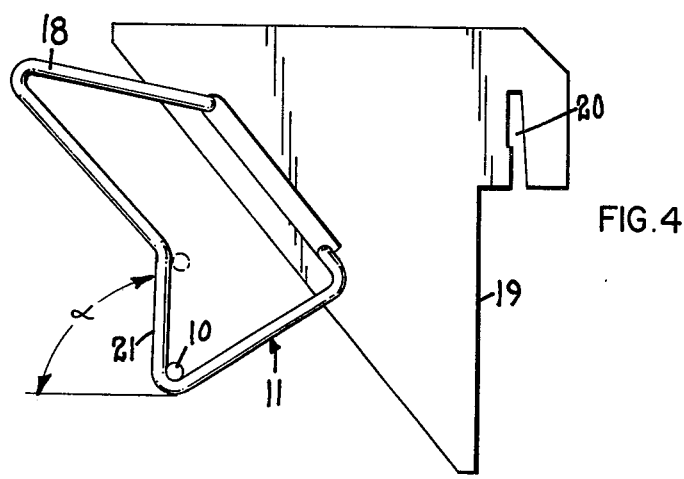
FIG. 4 illustrates the cable clip and its plate.

FIG. 4 illustrates a cable clip more clearly. It consists of a metal clip 18, carried on a plate 19 comprising a retaining groove 20. Clip 18 has a front web 21 which, as shown in the drawing, is at an angle $\alpha$ [alpha] being somewhat greater than 90°, for example 93°. Groove 20 at the back of plate 19 permits each plate to be hung from the front of the cage, as shown in FIG. 2.

OPERATION

The operation of the preferred embodiment is as follows:

Located at the forward end of the cable, not shown in the drawing, is a motor-driven tensioning device, such as a piston-cylinder device which, when actuated, pulls the cable slowly in the direction of its longitudinal axis, for example towards the left in FIG. 1. This causes clips 12 to pivot about the axes 14, to the position shown in dotted lines in FIG. 5, thus raising the cable and freeing a passage between the bottom feed trough 5 and the top of cage-floor 3 or of upper run 8 of conveyor means 6. The eggs shown in FIG. 2 may now roll unimpeded onto the conveyor means.

Figure 5:
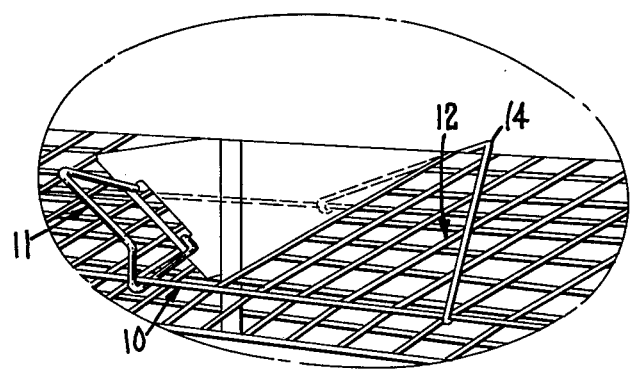
FIG. 5 shows the arrangement of the cable clip, the cable and the holders in two different positions.

Located at the other end of the cable remote from the traction device is a resilient return means, such as a elastic cord which, when the tensioning device is shut off, pulls cable 10 back to its starting position and returns the clips from the position shown in dotted lines in FIG. 5 to the position shown therein in full lines.

Both cable clips 11 and holders 12 may be arranged such that a pair of these components are fitted to drawing, with two arms for each cage. This is governed by local conditions.

What is claimed is:

1. In a battery arrangement for laying hens, with a plurality of cages, a floor sloping forwardly and downwardly and an egg-transporting device associated with all cages in one horizontal row, a cable adjustable in height being provided in the free passage between the said egg-transporting device and the bottom of the cage, the improvement comprising generally vertically extending arms to carry said cable, said arm being spaced longitudinally apart and being adapted to pivot about horizontal axes, said cable being adapted to be moved in the direction of its longitudinal axis by a tensioning device which engages one end of said cable, while a spring return device engages the other end thereof.

2. A battery-cage according to claim 1, the improvement comprising cable clips arranged at the front sides of said cages, said clips having front webs running substantially vertically.

3. A battery-cage arrangement according to claim 2 in which said front web enclosing an external angle which is larger than 90° with respect to the horizontal.

4. A battery-cage arrangement according to claim 3 in which said cable clip is of closed design.

5. A battery-cage arrangement according to claim 4 in which said cable clips are carried by a plate having a retaining groove being provided at the rear of each plate.

6. A battery-cage arrangement according to claim 5 in which said cable is in the form of stranded wire encased in a synthetic material.

7. A battery arrangement having a plurality of cages for laying hens and for collecting eggs having a floor sloping downward and forwardly toward an egg-transporting conveyor and having a cable adjustable in height provided in front of said cages and parallel with said conveyor to prevent said eggs from entering said conveyor, comprising:

a plurality of arms, each arm having a first end fixedly attached to said cable, said arms being spaced longitudinally along said cable, each arm having a second end hingeably attached to said cages so as to permit each arm to pivot and said cable to be moved in the direction of its lengthwise direction whereby said cable will rise in response to the pivoting motion of said arms and permit said eggs to enter said conveyor.

8. A battery arrangement having a plurality of cages for laying hens and for collecting eggs having a floor sloping downward and forwardly toward an egg-transporting conveyor and having a cable adjustable in height provided in front of said cages and parallel with said conveyor to prevent said eggs from entering said conveyor, comprising:

pivot means having a first end fixedly attached to said cable, said pivot means being spaced longitudinally along said cable, said pivot means having a second end attached to said cages so as to permit said pivot means to pivot when said cable is moved in the direction of its longitudinal dimensions whereby said cable will rise in response to the pivoting motion of said pivot means and permit said eggs to enter said conveyor.

9. A battery arrangement according to claim 8, including:

guide means for preventing said cable from rising in response to pressure exerted from eggs biased against said cable.

10. A battery arrangement according to claim 9 wherein said guide means includes a plurality of cable clips.

11. A battery arrangement according to claim 10 wherein said cable clips include web means attached to a front side of each of said cable clips for guiding said cable;

and wherein said web means is enclosed and said web means includes a substantially vertical member against which said cable can be biased;

and wherein said member is slightly inclined towards said cages so as to prevent the pressure of said eggs on said cable from lifting said cable.

12. A battery arrangement according to claim 11 wherein said clips include readily removable clasping means at the rear of said plate for removable engagement of said plate to said cages.

13. A battery arrangement having a plurality of cages for laying hens and for collecting eggs having a floor sloping downward and forwardly toward an egg transporting conveyor and having a cable adjustable in height in front of said cages and parallel with said conveyor to prevent said eggs from entering said conveyor, comprising:

(a) a plurality of arms, each arm having a first end fixedly attached to said cable, said arm being spaced longitudinally along said cable, each arm having a second end hingeably attached to said cages so as to permit each arm to pivot and said cable to be moved in the direction of its lengthwise dimension, whereby said cable will rise in response to the pivoting motion of said arms and permit said eggs to enter said conveyor;

(b) a plurality of cable clips longitudinally spaced along said cable and attached to a front side of said cages and including web means attached to each of said clips and having a substantially vertical member slightly inclined toward said cages upon which said cable can be biased, so as to prevent pressure of said eggs on said cables from lifting said cable;

(c) attaching means for attaching said cable clips to said cages in a readily movable clasping engagement.

* * * * *